July 19, 1955
R. S. HART
2,713,662
MEANS FOR MEASURING MOISTURE CONTENT OF TEXTILES
Filed June 24, 1953
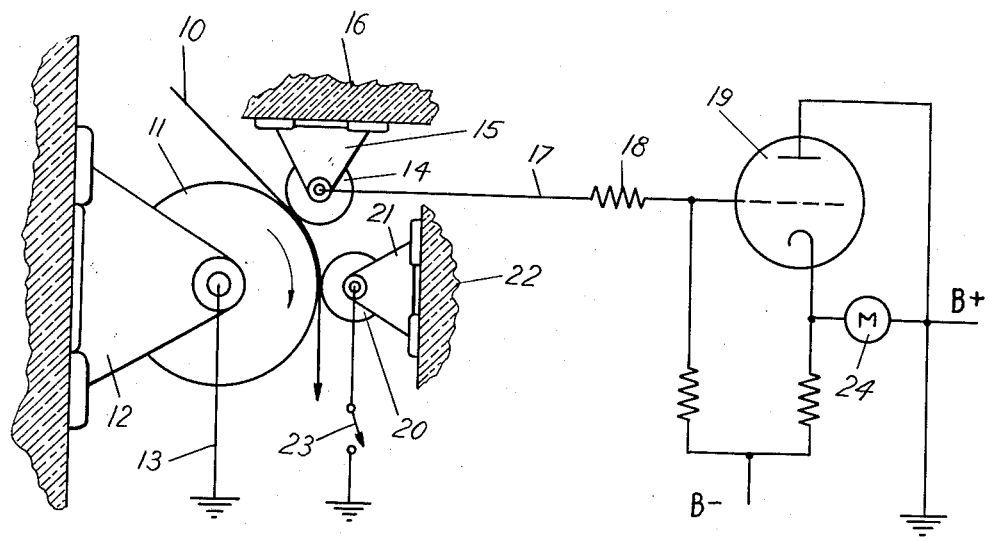
INVENTOR.
Raymond S. Hart
BY M. Bjaundal
Atty.

United States Patent Office 2,713,662
Patented July 19, 1955

2,713,662

MEANS FOR MEASURING MOISTURE CONTENT OF TEXTILES

Raymond S. Hart, Brooklyn, N. Y.

Application June 24, 1953, Serial No. 363,858

1 Claim. (Cl. 324—65)

This invention relates to improvements in method and means for measuring moisture in textiles, and specifically refers to an improved contactor and measuring technique which eliminates some of the difficulties previously experienced.

Measurements of moisture in textiles by means of conductivity type of meters has always been a difficult matter due to various factors involved. Some of the difficulties in making such measurements are due to the fact that the cloth to be measured is often unevenly moist throughout various parts of same. While in some cases the moisture may be entirely on the surface of the textile, in other cases it may be unevenly distributed in the interior of the material. In such cases it is very difficult to get a satisfactory moisture determination with the ordinary type of moisture meter. A large number of determinations over an extended area of the textile will have to be made, and these will have to be averaged to get a reliable reading. In my present invention, I have eliminated these difficulties by providing a novel method of making contact by means of two rollers in such a manner that a reading may be obtained with or without the second roller, thus giving an immediate indication of whether there is a moisture "gradient" present.

The main object of my invention is to provide a method and means for measuring not only the moisture content of a textile while running as a web of material but also to make possible immediate discovery of two things: firstly—the moisture percentage throughout the thickness of the material, secondly—whether or not the surface moisture is greater than the average throughout the thickness.

Another object of my invention is to provide a novel contactor arrangement embodying a plurality of contacting rollers which may be switched in or out as desired during the measurement.

Other objects and advantages of my invention will be apparent during the course of the following description and claim.

In the accompanying drawing, forming a part of specification, in which like numerals are employed to designate like parts throughout, The single figure represents a detailed mechanical and circuit arrangement of a moisture measuring device embodying my invention.

In the drawing, where for the purpose of illustration is shown a preferred embodiment of my invention, the numeral 10 designates a web of textile material being run over roller 11, which is supported upon base 12. The roller 11 is grounded by means of wire 13. A measuring roller 14 is supported in bracket 15 which is held by arm 16. The measuring roller 14 is connected by means of wire 17 through resistor 18 to the grid of the tube 19.

An auxiliary measuring roller 20 is mounted upon bracket 21, fed by arm 22. The auxiliary roller 20 is connected to ground through switch 23.

The circuit connected to tube 19 works as a D. C. amplifier and is actually a resistance indicating device for measuring very high resistivities. A meter 24 is preferably used as a galvanometer and the greatest accuracy is obtained by using standards of suitable values to indicate given moisture conditions.

The operation of my device is as follows: The circuit indicated in Figure 1 is for a wet range meter installation where the meter is calibrated for a given wetness and indicates directly variations above and below this point. There are, therefore, not any standards for comparison as the meter is pre-calibrated for the particular service it is to perform.

In measuring the moisture of the web 10, the switch 23 is first left open and the operator notes the reading of meter 24. He thereupon closes switch 23 and again notes the reading of meter 24. It is apparent that in the first measurement the measuring current will go from ground through wire 13 to roller 11, to roller 14 through wire 17 and the grid of tube 19. In the second measurement, however, the current may either go from ground through switch 23 to roller 20, through web 10 to roller 11, through web 10 again to roller 14 and through wire 17 to the grid of tube 19, or it may go from roller 20 along the surface of web 10 to roller 14 and hence through wire 17 to the grid of the tube 19. In the first measurement, the reading is a measure of the electrical resistance through a single layer of the material, while in the second measurement the reading may be a combination of two resistance readings through the web with a resistance reading along the surface of the web. If surface moisture is present, the second reading will show a higher moisture content than the first. If no surface moisture is present, the second reading will show a lower moisture reading because it is measured through two thicknesses of the material. In this manner the operator may tell at a glance whether surface moisture is present or not, which is an important consideration in many types of textile operations.

It is to be understood that the form of my invention, herewith shown and described, is to be taken as a preferred example of the same and that various changes in the shape, size and arrangement of parts may be resorted to, without departing from the spirit of my invention or the scope of the subjoined claim.

Having described my invention I claim:

A moisture measuring device of the character described comprising a combination of a metallic roller; a textile web running over said metallic roller; a pair of metallic contacting rollers in operable connection with said textile web on said first roller, said pair of contacting rollers being axially parallel to said first roller and being furthermore in pressure contact with the textile web on same; a sensitive electronic indicating circuit permanently connected to one of said contacting rollers, said first roller being permanently connected to ground and a switch connecting said second contacting roller to ground when desired.

References Cited in the file of this patent

UNITED STATES PATENTS

| | | |
|---|---|---|
| 1,212,014 | Butts | Jan. 9, 1917 |
| 2,401,832 | Krogh | June 11, 1946 |
| 2,484,594 | Spangenberg | Oct. 11, 1949 |
| 2,608,604 | Hart | Aug. 26, 1952 |